(12) United States Patent
Hirata et al.

(10) Patent No.: US 6,828,015 B2
(45) Date of Patent: Dec. 7, 2004

(54) COMPOSITE CONTAINING THIN-FILM PARTICLES HAVING CARBON SKELETON, METHOD OF REDUCING THE THIN-FILM PARTICLES, AND PROCESS FOR THE PRODUCTION OF THE COMPOSITE

(75) Inventors: Masukazu Hirata, Tsukuba (JP); Takuya Goto, Tsukuba (JP); Kouji Takenaka, Tsukuba (JP); Ryu Iwasaki, Tsukuba (JP); Shigeo Horiuchi, Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/359,683

(22) Filed: Feb. 7, 2003

(65) Prior Publication Data

US 2003/0187124 A1 Oct. 2, 2003

(30) Foreign Application Priority Data

| Feb. 8, 2002 | (JP) | 2002-032882 |
| Aug. 30, 2002 | (JP) | 2002-254023 |
| Aug. 30, 2002 | (JP) | 2002-254030 |

(51) Int. Cl.$^7$ ................................................ B32B 5/16
(52) U.S. Cl. .................... 428/323; 428/325; 428/327; 428/402; 428/403; 428/404; 428/407; 106/436; 106/472; 106/474; 106/478

(58) Field of Search ................................. 428/323, 325, 428/327, 402, 403, 404, 407; 106/430, 472, 474, 478, 436

(56) References Cited

U.S. PATENT DOCUMENTS 6,596,396 B2 * 7/2003 Hirata et al. ................ 428/402

* cited by examiner

*Primary Examiner*—Leszek B Kiliman
(74) *Attorney, Agent, or Firm*—Wenderoth, Lind & Ponack, L.L.P.

(57) ABSTRACT

There are provided a composite which is formed of a component (a) or a component (b) and a component (c), or the component (a) or the component (b) and a component (d), and is suitable for various uses such as an electrically-conductive material, (a) oxidized form thin film particles which are obtained by oxidizing graphite, have a carbon skeleton, have a thickness of 0.4 nm to 10 nm and a planar-direction size of at least 20 nm and have lyophilic to a liquid having a relative dielectric constant of at least 15, (b) reduced form thin film particles obtained by partially or completely reducing the above thin film particles so as to have an oxygen content of 0 to 35 wt %, (c) a macromolecule as a matrix component, and (d) low molecular-weight parts which bond a plurality of the thin film particles by a covalent bond, a process for the production of the composite, and a method for reducing oxidized form thin film particles.

33 Claims, 5 Drawing Sheets

COMPOSITE CONTAINING THIN-FILM PARTICLES HAVING CARBON SKELETON, METHOD OF REDUCING THE THIN-FILM PARTICLES, AND PROCESS FOR THE PRODUCTION OF THE COMPOSITE

FIELD OF THE INVENTION

The present invention relates to a composite containing thin film particles having a carbon skeleton, a method for reducing the thin film particles and a process for the production of the composite. More specifically, it relates to a composite containing thin film particles having a carbon skeleton which composite is suitable for various uses such as a high strength material, a material having a small heat-deformation, a material having high barrierability to small molecules or the like, a material having a high thermal conductivity and an electrically-conductive material used for a circuit or the like, a method for reducing the above thin film particles and a process for the production of the above composite.

BACKGROUND OF THE INVENTION

In recent years, searches for materials having high anisotropy of shape and applications thereof are proceeding rapidly. As an anisotropic shape material having carbon atoms as a skeleton, there are known one-dimensional materials such as a graphite fiber or a carbon nanotube being an especially slender graphite fiber and two-dimensional materials such as graphite, graphite fluoride and graphite oxide. Of these, each of graphite, graphite fluoride and graphite oxide is a multi-layer structure matter in which two-dimensional fundamental layers are laminated, and multi-layer structure matters having so many layers are generally known. Concerning graphite oxide, very thin graphite oxide having a small number of layers has been made (for example, N. A. Kotov et al., Adv.Mater., 8,637(1996)). The present inventors also have found a process for producing thin film particles of such graphite oxide (when the number of layers is one, e.g., it is preferred to call it "graphene oxide" ("graphene" is the name for one graphite layer)) in high yield and produced thin film particles having a very small number of layers similar to graphite (when the number of layers is one, it is preferred to call it "graphene") by reducing the above thin film particles (JP-A-2002-53313). Further, the present inventors have produced especially broad thin film particles, a lamination layer aggregate in which the thin film particles are laminated and broad, and reductants of these (Japanese Patent Application No. 2001-374537, Japanese Patent Application No. 2001-374538).

The fundamental layer of graphite oxide is thought to have a structure in which acidic hydroxyl groups, etc., are bonded to both sides of a carbon skeleton (composed of $sp^3$ carbon and $sp^2$ carbon, $sp^3$ carbon is larger in amount) having a thickness equivalent to one carbon atom or two carbon atoms (for example, T. Nakajima et al., Carbon, 26, 357(1988); M. Mermoux et al., Carbon, 29, 469(1991)). When the thickness of the carbon skeleton is equivalent to the size of one carbon atom, and hydroxyl groups are bonded to both sides of the carbon skeleton and interlayer water is remarkably little in amount, the thickness of the fundamental layer is 0.61 nm. Further, when graphite oxide has a high oxidation degree and is dried sufficiently, the content of oxygen in the graphite oxide is approximately 30 to 40 wt %.

Although the above graphite oxide having an oxygen content of approximately 30 to 40 wt % generally has a high resistivity of about $10^6$ to $10^8$ $\Omega$·cm and has remarkably low electric conductivity, it is known that the above graphite oxide comes to have an electronic state having many $sp^2$ bonds analogous to graphite by partial or complete reduction and is thus increased in electric conductivity. The graphite oxide increased in electric conductivity by the reduction can be applied, as a semiconductor or a conductor, in various fields such as semiconductor devices, wiring materials, fillers for anti-electrification and anti-electrostatic, so that it is remarkably useful.

The present inventors have disclosed thin film particles which are obtained by oxidizing graphite and which have a thickness of 0.4 to 10 nm and a planar direction size of 20 nm or more, are dispersible in a liquid having a relative dielectric constant of 15 or more and have a carbon skeleton in JP-A-2002-53313. In the specification thereof, the present inventors indicate that heating, a reducing agent or an electrode reaction can reduce the thin film particles. Further, the present inventors have disclosed large-sized thin film particles having a carbon skeleton of a planar-direction size of 500 $\mu$m or more in Japanese Patent Application No. 2001-374537 and similarly indicated that heating, a reducing agent or an electrode reaction can reduce these thin film particles too.

The above thin film particles of graphite oxide (to be referred to as "oxidized form thin film particles" hereinafter) are increased in electric conductivity by partial or complete reduction, as described above. In particular, as a general behavior of graphite oxide, reduction by heating can convert even the inside of a multi-layer particle into a structure similar to that of graphite. It is known that, when heating is carried out in a state where a plurality of the particles are bonded to each other, intermolecular forces arise in an interlayer inside each multi-layer particle or between a plurality of the particles so that a macroscopic shape like a general graphite film can be provided (J. Maire et al., Carbon, 6,555(1968)). The oxidized form thin film particles are converted into reduced form thin film particles by similar heating (JP-A-2002-53313).

Here, when the thin film particles are completely reduced, each fundamental layer of the thin film particles becomes almost graphite's fundamental layer (graphene). When the thin film particles are multi-layer particles, the interlayer distance is almost equal to the interlayer distance of graphite. However, each multi-layer particle has a structure of a turbostratic tendency in which the mutual positional relationship of respective layers is more turbulent than that of graphite. Further, when the thin film particles are partially reduced, oxygen and the like remain in each fundamental layer and its interlayer distance becomes larger than that of graphite.

The above oxidized form and reduced form thin film particles can be called "graphite oxide nanofilm" ("graphene oxide nanofilm", when the number of layers is one), when the fraction of oxygen is high. When the oxygen fraction is low or no oxygen is contained, the thin film particles can be called "graphite nanofilm" ("graphene nanofilm", when the number of layers is one). Further, uniformly, these thin film particles are respectively called an oxidized form single-layer carbon nanofilm or multilayer carbon nanofilm and a reduced form single-layer carbon nanofilm or multilayer carbon nanofilm. Using the name of "carbon nanofilm" can prevent any confusion from being caused by calling the thin film particles having a turbostratic tendency "graphite", as described above.

Concerning such oxidized form and reduced form thin film particles, there have been synthesized some composites with a macromolecule. These composites are intercalation compounds of the thin film particles and the macromolecule. Although their interlayer distances (interval of a fundamental period of a layer structure) depend upon a mixing ratio or additives at the time of synthesis, it is reported that the interlayer distance of a composite with poly(ethylene oxide) is 1.28 nm (Y. Matsuo et al., Carbon, 34, 672(1996), polyethylene oxide is added), that the interlayer distance of a composite with polyaniline is 1.2 nm (S. Higashika et al., Carbon, 37, 351(1999), aniline (monomer) is polymerized in interlayer spaces), and that the interlayer distance of a composite with poly(vinyl acetate) is 1.15 nm (P. Liu et al., Carbon, 37, 2073(1999), vinyl acetate (monomer) is polymerized in interlayer spaces).

However, each of these synthesis examples contains a relatively high fraction of the thin film particles. These examples target a composite having high periodicity, the whole of which is an intercalation compound. In contrast, there have not been reported a composite with a macromolecule in which the majority of thin film particles contained is relatively randomly located, like a general composite material obtained by simply mixing a reinforcing component such as a filler and a matrix component, and a composite formed by covalent-bonding a lot of thin film particles to each other with low molecular-weight parts.

From a wider standpoint, further, there is known a composite containing planar particles obtained by peeling particularly a lamellar clay mineral (silicate) (for example, K. Yano et al., J.Appl.Polym.Sci., 49, 1259(1993)) as a composite of two-dimensional particles having an anisotropic shape, like the above thin film particles, with a macromolecule. Further, a composite containing a carbon nanotube (for example, X. Gong et al., Chem.Mater., 12, 1049(2000)) is known as a composite of carbonaceous particles having an anisotropic shape with a macromolecule. Each of these composites is a random composite.

Even when such a random composite contains a relatively small amount of the thin film particles, the composite easily obtains various properties such as high strength. Further, it is thought that, since the anisotropy of the composite as a whole is low, the composite is easy to handle. Further, the production of the composite becomes relatively easy if it is possible by a simple mixing.

SUMMARY OF THE INVENTION

It is an object of the present invention to provide a composite having a relatively low periodicity which composite is formed of thin film particles and a macromolecule or the thin film particles and a reactive compound, a method for reducing the thin film particles and a process for the production of the above composite.

According to the present invention, there is provided a composite formed of a component (a) or a component (b) and a component (c), or the component (a) or the component (b) and a component (d), (a) oxidized form thin film particles which are obtained by oxidizing graphite, have a carbon skeleton, have a thickness of 0.4 nm to 10 nm and a planar-direction size of at least 20 nm and have lyophilic to a liquid having a relative dielectric constant of at least 15, (b) reduced form thin film particles obtained by partially or completely reducing the above thin film particles so as to have an oxygen content of 0 to 35 wt %, (c) a macromolecule as a matrix component, and (d) low molecular-weight parts which bond a plurality of the thin film particles by a covalent bond.

According to the present invention, further, there is provided a composite according to the above, wherein the reduced form thin film particles are obtained by heating a dispersion in a liquid of thin film particles which have a carbon skeleton, have a thickness of 0.4 nm to 100 nm and a planar-direction size of at least 20 nm, are obtained by oxidizing graphite, and are dispersible in a liquid having a relative dielectric constant of at least 15, at 130° C. or higher, to reduce the thin film particles while holding the dispersed state of the thin film particles.

According to the present invention, further, there is provided a composite according to the above, wherein the reduced form thin film particles are obtained by irradiating thin film particles which have a thickness of 0.4 nm to 100 nm and a planar-direction size of at least 20 nm, are obtained by oxidizing graphite, have a carbon skeleton and are dispersible in a liquid having a relative dielectric constant of at least 15, with light.

According to the present invention, further, there is provided a process for the production of the above composite formed of thin film particles and a macromolecule, which process comprises mixing a dispersion of oxidized form thin film particles with a macromolecule which is in a molten state or in the state of a solution, then removing a dispersion medium of the dispersion or the dispersion medium and a solvent of the solution.

According to the present invention, further, there is provided a process for the production of the above composite formed of thin film particles and a macromolecule, which process comprises mixing a dispersion of oxidized form thin film particles with a polymerizable compound or a solution of the polymerizable compound, polymerizing the polymerizable compound to convert it into a macromolecule and removing a dispersion medium of the dispersion or the dispersion medium and a solvent of the solution.

According to the present invention, further, there is provided a process for the production of the above composite formed of thin film particles and low molecular-weight parts which bond the thin film particles to each other, which process comprises mixing a dispersion of oxidized form thin film particles with a reactive compound having at least one functional group which can form a covalent bond with the thin film particles or a solution of the above reactive compound to bond a plurality of the thin film particles to each other by covalent bonds and removing a dispersion medium of the dispersion or the dispersion medium and a solvent of the solution.

According to the present invention, further, there are provided uses of the above composite as a variety of materials.

According to the present invention, further, there is provided a method for reducing thin film particles which are obtained by oxidizing graphite, have a carbon skeleton and are dispersible in a liquid having a relative dielectric constant of at least 15, which method comprises heating a dispersion of the thin film particles in a liquid at 130° C. or higher, to reduce the thin film particles while holding the dispersed state of the thin film particles.

DETAILED DESCRIPTION OF THE INVENTION

Figure 1:
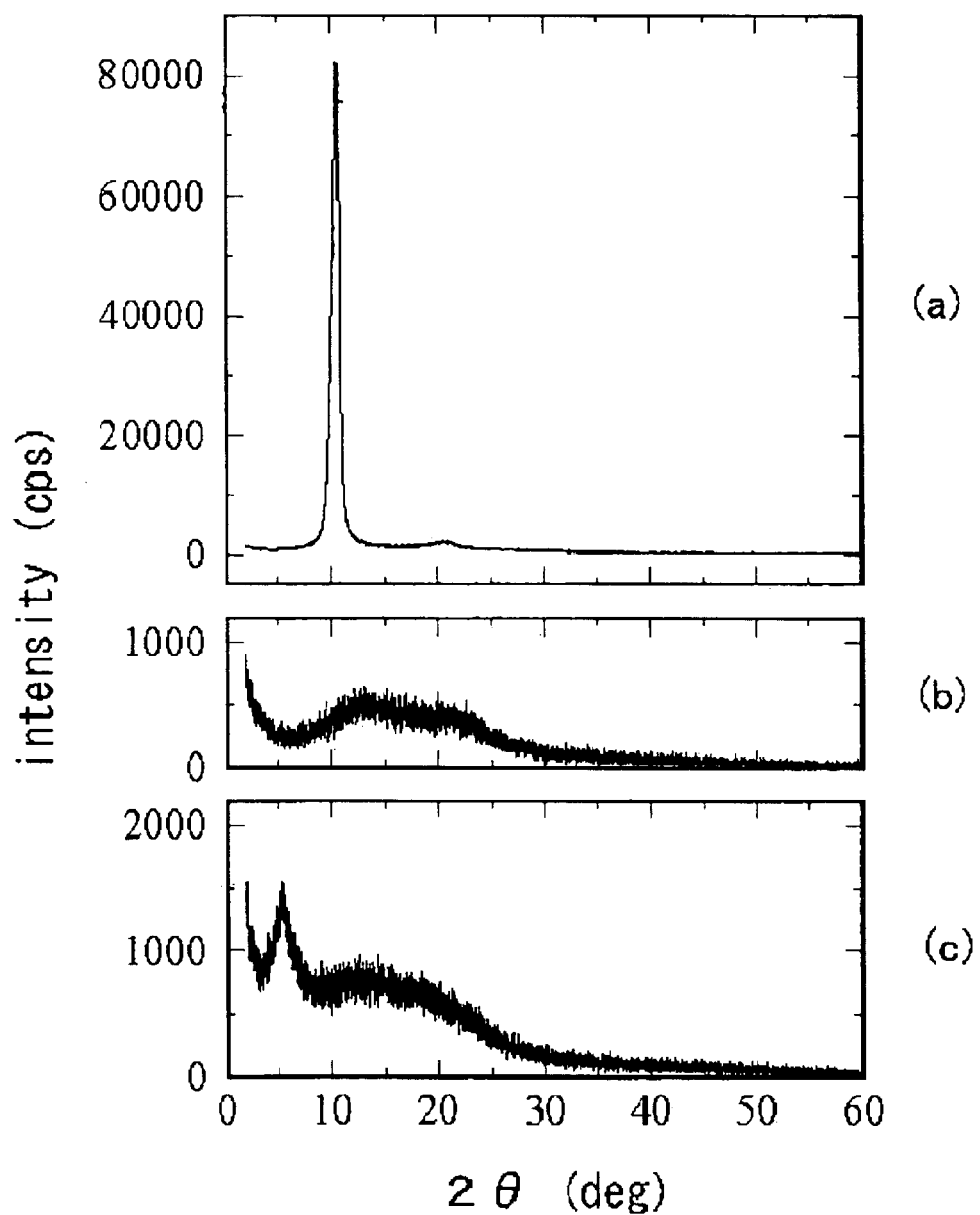
FIG. 1 shows X-ray diffraction profiles (in order from top to bottom, thin film particles, poly(vinyl acetate), and a composite of 4 wt % of oxidized form thin film particles having a planar-direction size of about 2 μm or less and poly(vinyl acetate)).
Figure 2:
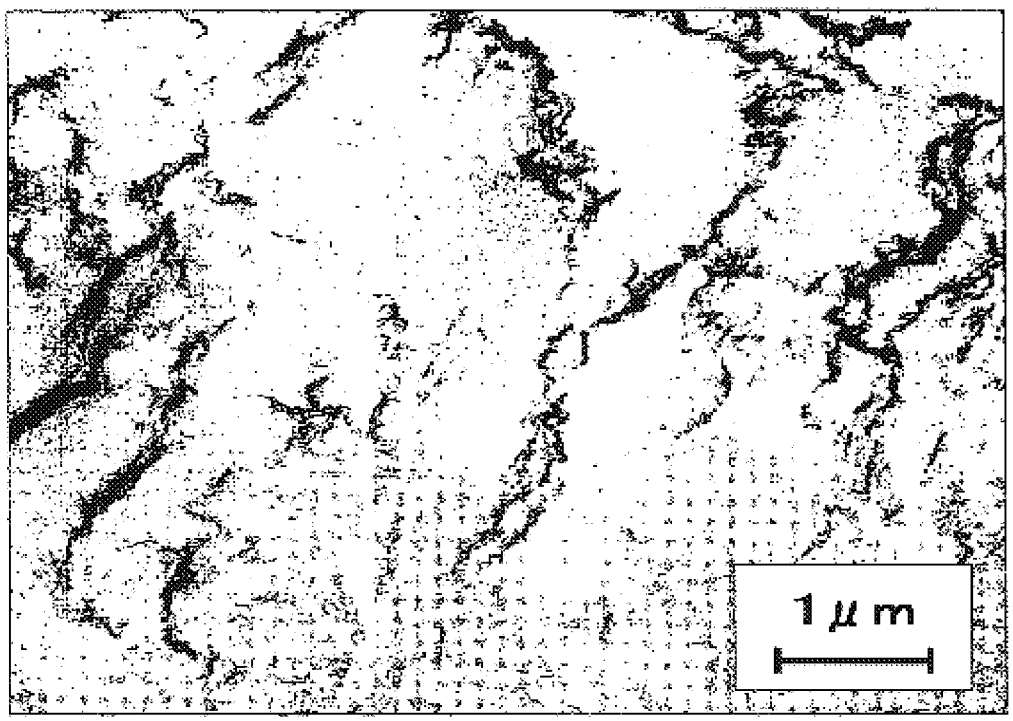
FIG. 2 shows a transmission electron microscope (TEM) image (a cross section of a composite of 2 wt % of oxidized form thin film particles having a planar-direction size of about 2 μm or less and poly(vinyl acetate)).
Figure 3:
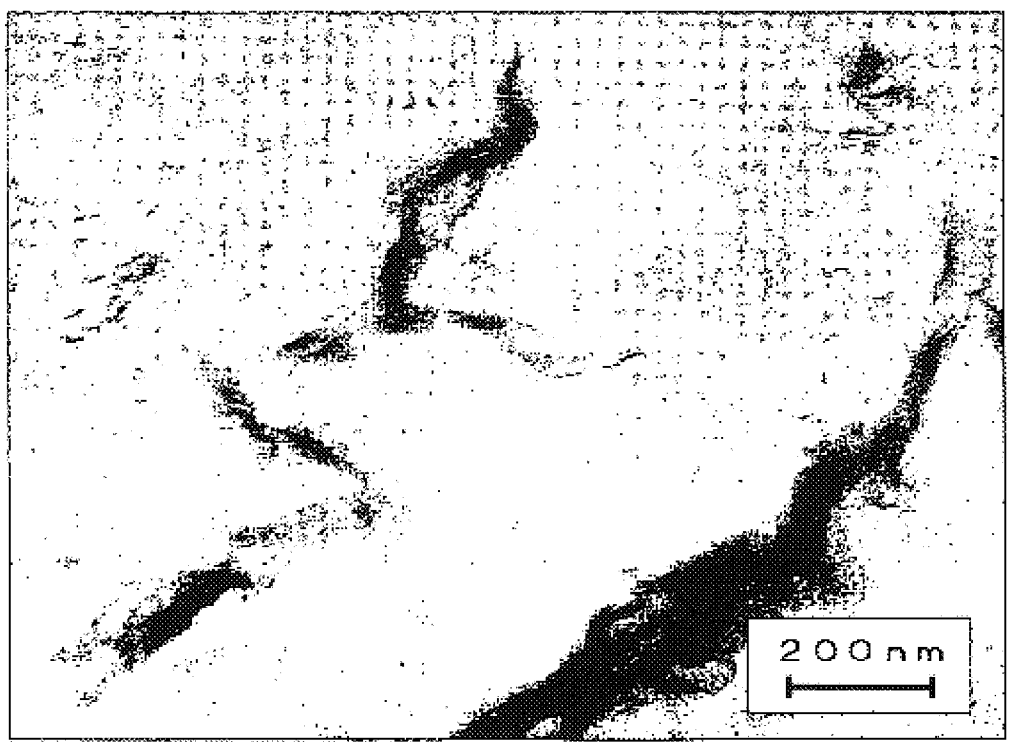
FIG. 3 shows a TEM image (the same composite as that in FIG. 2, detail).
Figure 4:
FIG. 4 shows a TEM image (a cross section of a composite of 4 wt % of oxidized form thin film particles having a planar-direction size of about 2 μm or less and poly(vinyl acetate)).
Figure 5:
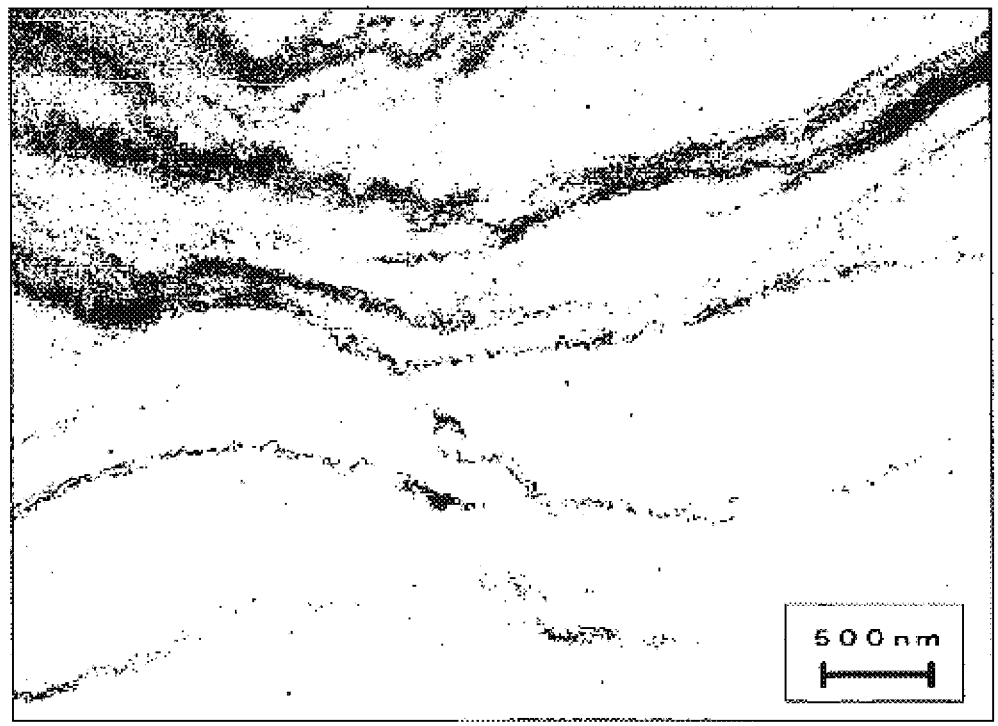
FIG. 5 shows a TEM image (a cross section of a composite of 2 wt % of oxidized form thin film particles having a planar-direction size of about 20 μm and poly(vinyl acetate)).
Figure 6:
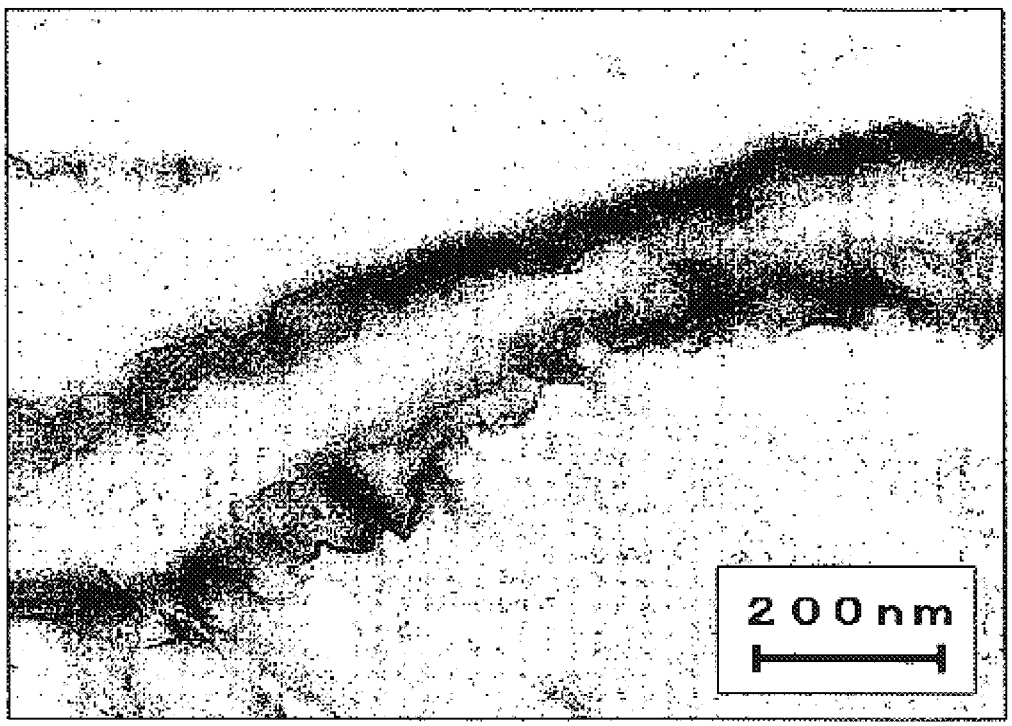
FIG. 6 shows a TEM image (the same composite as that in FIG. 5, detail).

For achieving the above purposes, the present inventors have studied on an increase in the affinity of thin film particles (oxidized form particularly) and a macromolecule and various addition methods of both of these and completed the present invention relating to a composite having a low periodicity and formed of thin film particles and a macromolecule, a process for the production thereof and uses thereof.

(Synthesis of Oxidized Form Thin Film Particles)

The oxidized form thin film particles (oxidized form carbon nanofilm) used in the present invention are selected from thin film particles obtained by chemically or electrochemically oxidizing a graphite containing only a small amount of impurities and having a well-developed layer structure and high crystallinity as a raw material and then carrying out purification for removing small ions, etc., as much as possible, to advance a spontaneous layer separation, as previously disclosed in JP-A-2002-53313 and Japanese Patent Application No. 2001-374537. In addition, particularly as a method of advancing layer separation, there is a method in which a dispersion of thin film particles is heated at approximately 100° C. This method synthesizes a dispersion in which remarkably thin film particles, which can be called an oxidized form carbon nanofilm, are dispersed in water.

Concerning the dimensions of the thin film particles, a thin film particle having a relatively small dimensions has a thickness of 0.4 nm to 10 nm (c-axis direction of the raw graphite), preferably 0.4 nm to 5 nm, and a planar-direction size of 20 nm or more (direction of a-axis and b-axis of the raw graphite), preferably 200 nm or more, further preferably 1 μm or more. The above dimensions are selected depending upon uses of the composite containing the thin film particles.

In the stage where the synthesis of the thin film particles is terminated, the morphology of the thin film particles is a dispersion using water as a dispersion medium. The above dispersion medium of the dispersion can be changed from the water to a high polarity liquid having a relative dielectric constant of about 15 or higher other than water, such as methanol, ethanol, acetone or 2-butanone. As a means of using such a high polarity liquid other than water as a main dispersion medium, there are a method in which the high polarity dispersion medium other than water is added in an amount sufficiently larger than the amount of the water contained in the dispersion to dilute the dispersion and a method in which the high polarity dispersion medium other than water is added, then a supernatant liquid is removed by means of centrifugation and decantation, etc., and these steps are repeated to gradually exchange the dispersion medium from the water to the high polarity dispersion medium other than water.

As described above, the oxidized form thin film particles can be prepared as a dispersion using various liquids as a dispersion medium. Therefore, it becomes extremely easy to mix the thin film particles with various macromolecules or reactive compounds. The dispersion of the thin film particles largely varies in flowability depending upon the concentration, since the thin film particles have high anisotropy of shape. For example, a dispersion having a concentration of about 2 wt % does not flow even when a container is inclined, although it depends on the dimensions or shape of the thin film particles contained.

(Synthesis of Reduced Form Thin Film Particles)

The oxidized form thin film particles can be reduced by various known reduction reactions using a reducing agent or an electrode reaction (electrolytic reduction). However, it is thought that, especially in the case of using the reducing agent, complete reduction including the reduction of the inside of a multi-layer particle is difficult unless its fundamental layers are separated. On the other hand, it is possible to almost completely reduce even the inside of a multi-layer particle in the case of reduction by heating (J. Maire et al., Carbon, 6, 555(1968)) known as a general behavior of graphite oxide. The oxidized form thin film particles are converted into reduced form thin film particles by similar heating, as previously disclosed by JP-A-2002-53313.

Here, when the thin film particles are completely reduced, each fundamental layer of the thin film particles becomes almost graphite's fundamental layer (graphene). The interlayer distance (not defined in the case of single-layer) is almost equal to the interlayer distance of graphite. However, each thin film particle has a structure of a turbostratic tendency in which the mutual positional relationship of respective layers is more turbulent than that of graphite. Further, the mutual positional relationship of a plurality of the thin film particles in the planar direction becomes a very turbostratic (almost random) layer structure. In addition, it is a structure in which gaps are present between a plurality of the particles.

On the other hand, it is not necessarily required that the reduction degree of the thin film particles is complete. Partial reduction is acceptable depending upon purposes. In this case, each fundamental layer contains oxygen, etc., and its interlayer distance is larger than that of graphite.

As for the heating-reduction conditions of the present invention, it is preferred that the thin film particles, obtained by oxidizing graphite, in the state of dispersion are heated at 130° C. or higher. Although the optimum heating temperature differs according to an aimed degree of a reduction product, generally, heating at 160° C. or higher is more preferable in view of efficiency. When the heating temperature is less than 130° C., the rate of reduction is extremely slow so that it is practically unsuitable.

Further, when the boiling point of a liquid to be used as a dispersion medium is lower than the heating temperature, it is possible to increase the temperature up to an intended temperature by applying a proper pressure.

As a dispersion medium used when the dispersion is heated, a liquid having a relative dielectric constant of at least 15 is used alone. Otherwise, two or more liquids are mixed and the mixture is used as the dispersion medium. In the latter case, a liquid having a relative dielectric constant of less than 15 may be partially used.

The reduction by heating rapidly arises at especially about 150° C. to 200° C. In addition, it proceeds mildly up to 1,000° C. or higher under a nonoxidative atmosphere or in vacuum. Further, it is expected that the thin film particles become larger crystals by pressurization at a high temperature. On the other hand, the thin film particles are burnt down at 600° C. or lower in the air so that only partial reduction where oxygen, etc., slightly remain is possible. In the reduction by heating, water, oxygen, carbon compounds, etc., are eliminated. As a result, the content of oxygen changes from approximately 40 wt % before the reduction to 0 to 35 wt %.

As described above, the reduced form thin film particles (reduced form carbon nanofilm) are synthesized from the oxidized form thin film particles (oxidized form carbon nanofilm) by heating at a relatively low temperature.

In the production of the composite, the above reduction by heating can be carried out after forming the composite or at the time of mixing with a macromolecule, etc., as described later.

In the present invention, the oxidized form thin film particles can be reduced by light-irradiation.

The wavelength of light used for the light irradiation is preferably in the range of from 100 nm to 1,100 nm. A usable light source includes an ultrahigh pressure mercury lamp (280 nm to 600 nm), a xenon lamp (300 nm to 1,000 nm), a deuterium lamp (110 nm to 600 nm), an argon gas laser (351 nm to 515 nm), a helium-neon gas laser (633 nm), a YAG laser (1,060 nm), various excimer lasers ($F_2$: 152 nm, ArF: 193 nm, KrF: 249 nm, etc.) and various semiconductor lasers having a wavelength range of approximately 600 to 1,100 nm.

It is also possible to reduce a thin film layer formed of the thin film particles on a substrate by irradiating it with light. A dispersion in a liquid of thin film particles, which are obtained by oxidizing graphite, are dispersible in a liquid having a relative dielectric constant of at least 15 and have a carbon skeleton, is applied to a substrate to form a thin film layer of the thin film particles and then the entire surface of the thin film layer or a desired portion of the thin film layer is selectively irradiated with light, whereby a desired reduced thin film layer pattern can be formed in the thin film layer.

Further, the thin film particles can be reduced with holding a high disperse state by irradiating the dispersion of the thin film particles in the liquid with light. As a dispersion medium used for the light irradiation to the dispersion, a liquid having a relative dielectric constant of 15 or higher is used alone. Otherwise, two or more liquids are mixed and the mixture is used as the dispersion medium. In the latter case, a liquid having a relative dielectric constant of less than 15 may be partially used.

(Characteristics of Thin Film Particles as a Composite Component)

In the thin film particles synthesized as above, each layer has a dense carbon skeleton having a high periodicity. Particularly, the reduced form thin film particles have a denser structure in which each skeleton has many pi electrons. Therefore, when the thin film particles as a filler component forms a composite with the macromolecule, etc., as a matrix component, the formed composite can obtain high strength, a low heat deformation, high barrierability to small molecules or the like, high thermal conductivity, electric conductivity (particularly in the case of the reduced form), light resistance or weather resistance. Here, concerning the strength, the bending strength of the thin film particles is lower than that of an other transformless filler, since the thin film particles can be largely transformed although they have a dense skeleton. However, the thin film particles easily follow a transformation of the composite as a whole so that the composite becomes hard to break. As for the electric conductivity, the composite can be also used as a general conductor such as a conductor for a circuit. Since the electric conductivity of the composite is lower than that of a metal or the like, the composite is mainly used for the purpose of an anti-electrification property or an electromagnetic shieldability (broad wavelength region of from a radio wave to an X ray) and used for a resistance matter for heat generation. Since the thin film particles are stable at up to 2,000° C. or higher in a nonoxidative atmosphere or in vacuum, the thin film particles give heat resistance to the composite. On the other hand, since the thin film particles are burnt down at approximately 600° C. in air or the like, it is easy to dispose of the composite by incinerating it. When the matrix component is harmless, no harmful gas is generated. Further, the thin film particles are remarkably stable at approximately 500° C. or less so that the composite is imparted with flame retardancy by shielding the penetration of oxygen. Further, it is possible to reuse the composite by melting it. Among the above many characteristics, the electric conductivity and the burning down due to heating, which are derived from the thin film particles, are largely different from those of a composite containing planar particles of silicate.

Particularly, the oxidized form thin film particles have a polar functional group and have affinity to many liquids. Therefore, a thin carbonaceous material, which is generally difficult to handle, can be easily handled in the form of dispersion, and the above carbonaceous material can be used for the production of the composite. Especially, an aqueous dispersion can be particularly easily handled, and no odor and no harmful waste are generated in the production of the composite. Further, it is possible to covalent-bond the thin film particles to the macromolecule or a variety of reactive compounds as a matrix component by their functional groups, as described later. These characteristics are different from those of a composite containing a carbon nanotube (particularly non-treated carbon nanotube).

Further, when the electronic nature or optical property of each particle of the thin film particles is expected, it is possible to isolate, for example, a plurality of thin film particles from each other by dispersing the thin film particles in the macromolecule.

(Macromolecule Component as a Matrix)

The macromolecule component which is a matrix in the present invention can be selected from a lot of generally-known organic polymers (e.g., organic polymers disclosed in Polymer Handbook (John Wiley & Sons,Inc.), Encyclopedia of Polymer Science and Engineering (ditto), and chemical marketable products of 13901 (The Chemical Daily Co., Ltd.)) and inorganic polymers (e.g., inorganic polymers producible by a sol-gel method). The molecular shape thereof can be selected from a linear shape, a cyclic shape, a branching shape, a shape including many crosslinked structures, and the like, depending upon purposes. Further, the macromolecule component may be a copolymer or a mixture of a plurality of macromolecules. Further, a copolymer or modified macromolecule into which a polar group is introduced may be used for improving the affinity to the thin film particles. Furthermore, it is possible to mix a polymerizable compound in the stage of relatively small molecules, such as a known monomer or oligomer, with the thin film particles and then polymerize the compound to obtain a macromolecule. Various known methods such as use of an initiator, irradiation of electromagnetic wave, e.g. ultraviolet light, irradiation of a particle beam, e.g. an electron beam, or heating can be used for the above polymerization.

(Mixing Method of Macromolecule Component, etc.)

As a method of mixing the thin film particles and the macromolecule homogeneously, when a high-polarity macromolecule soluble in a solvent having a high polarity is used, there can be adopted a method in which a solution of the above macromolecule in a solvent having a high polarity is mixed with the dispersion of the oxidized form thin film particles. The composite can be obtained by drying the thus-obtained mixture. Here, if polymerization is carried out after the mixing, it is possible to mix a polymerizable compound such as a monomer or an oligomer or a solution of the polymerizable compound similarly to the above and then polymerize the polymerizable compound. In this case, it is preferred to use the same liquid or a plurality of liquids having miscibility with each other as a solvent for the macromolecule, etc., and a dispersion medium for the thin film particles. In the above mixing method, the concentration of the dispersion is not specially limited. It is possible to use a dispersion having a relatively high concentration (provided that the upper limit is several wt % because of contacts of the particles with each other, unless the dispersion is specially concentrated). Further, it is also possible to dissolve a solid macromolecule in the dispersion of the thin film particles directly. However, when the concentration of the thin film particles is high, there increases a possibility that the thin film particles are deprived of the dispersion medium due to the dissolving of the macromolecule to generate a coagulation.

Further, when a macromolecule which can be molten by heating is used, there can be adopted a method in which the macromolecule is brought into a molten state at a high temperature and the dispersion of the oxidized form thin film particles is gradually added while carrying out degassing. This mixing method can be applied to both a case in which the macromolecule has a high polarity and a case in which the macromolecule has a low polarity. In the above mixing method, both the removal of the dispersion medium and the reduction of the thin film particles advance together with the mixing owing to the heating at a high temperature and the degassing. In this case, the thin film particles are decreased in polarity as they are reduced, so that the thin film particles are homogeneously dissolved even in a macromolecule having a low polarity. However, in this mixing method, when the concentration of the dispersion is high, an aggregation of the thin film particles precedes the mixing of the macromolecule and the thin film particles so that the dispersibility of the composite is decreased. Therefore, it is preferred to use a dispersion having a relatively low concentration for decreasing the above aggregation. Although the above concentration depends on the size of the thin film particle or the like, it is generally 2 wt % or less.

As a different mixing method, it is possible to spray the dispersion to a fine macromolecule powder, dry the resultant powder and then heat it or to further add the macromolecule to a composite containing a high concentration of the thin film particles.

Furthermore, there maybe added a different component which is capable of increasing the affinity of the thin film particles and the macromolecule.

(Reaction with Reactive Compound)

The oxidized form thin film particles have a lot of functional groups such as a hydroxyl group or a carboxyl group. Some reactions are expected from these functional groups. For example, the hydroxyl group is expected to react with formaldehyde, carboxylic acids, isocyanates, epoxides, or a different compound having a hydroxyl group, etc., and the carboxyl group is expected to react with a different compound having a hydroxyl group or different carboxylic acids, etc. Thus, by using a reactive compound having a plurality of functional groups or at least one polyfunctional group capable of forming a covalent bond with the thin film particles, it is possible that a plurality of the thin film particles are covalent-bonded to each other with a low molecular-weight part and it is also possible to generate a covalent bond between the thin film particles and the macromolecule being a matrix component. Particularly, when the macromolecule has a plurality of functional groups or a functional group which generates a plurality of bonds, it is possible to efficiently form crosslinkages between a plurality of the thin film particles.

(Production of Composite with Reactive Compound)

A composite of such a reactive compound and the thin film particles can be produced by mixing the dispersion of the thin film particles with the reactive compound or a solution of the reactive compound to generate a reaction and connect a lot of the thin film particles to each other and removing a dispersion medium of the dispersion or the dispersion medium and a solvent of the solution. In this case, it is preferred to use the same liquid or a plurality of liquids having miscibility to each other as the dispersion medium for the thin film particles and the solvent for the reactive compound.

(Fraction of Thin Film Particles)

The fraction of the thin film particles in the composite is not specially limited. However, when high strength or barrierability to a small molecule is expected, at least 1 vol % is required. In the case of a structural material or the like, when the fraction is too high, an obtained composite becomes fragile and it becomes an intercalation compound, so that it goes out of the range of the present invention. Therefore, the upper limit of the fraction of the thin film particles is maximally about 70 vol % and it is generally about 50 vol %, although it depends upon the density of the macromolecule or the reactive compound. In contrast, when the composite is a porous material and is used as a functional material such as a catalyst, the upper limit is about 99 vol % because a few low-molecular weight parts are required to bond a lot of the thin film particles to each other. On the other hand, for example, it is preferably about 0.0001 to 0.1 vol % for isolating the thin film particles from each other.

(Shape-change of Thin Film Particles)

In some cases, the thin film particles are changed in shape in the composite. This is because the thin film particles are extremely thin and are easily transformed and, when the affinity to the macromolecule or the like is low, the thin film particles undergo aggregation (isolated self-aggregation in the case of a low concentration, aggregation of further plural particles in the case of a high concentration). As a result thereof, various performances of an obtained composite are generally lower than those expected in a case where thin film particles dispersed are completely extended in a planar state. However, thanks to the above transformation of the thin film particles, there is seldom caused a deviation at an interface between the thin film particles and the matrix component even when a macroscopically transformation is given to the composite. This generates an effect of preventing peeling off. Further, when a thermoplastic resin or the like is used as the matrix component, the thin film particles can be transformed without any breakage in accordance with a transformation of the matrix component. Thus, the composite can be drawn for the purpose of increasing the orientation of a lot of the thin film particles and also decreasing the aggregation.

(Uses of Composite)

The composite containing the thin film particles, provided by the present invention, can be used for a variety of structural materials and functional materials thanks to the before-mentioned characteristics of the thin film particles as a composite component. More specifically, it can be used for a high strength material, a small heat-deformation material, a material having high barrierability to a small molecule, a high thermal conductivity material, an electrically conductive material used for a circuit or the like, a material having an anti-electrification property, a material having an electromagnetic shieldability (wide wavelength region of from a radio wave to an X ray), a resistant material for heat generation, a light-resistant or weather-resistant material, an incineratable material, a material which is reusable by melting, a flame-retardant material, a material which is heat resistant under a nonoxidative atmosphere, a protection material such as a paint, a sealant and a resist, a material using the electronic nature or optical property of each of the thin film particles, and the like. Further, in the case of a porous material, it can be used for a catalyst, a material for adsorption and the like. In these uses, known various additional substances may be added depending upon each use.

Further, it is possible to obtain a composite having a higher performance by advancing a carbonization of the composite of the present invention by heat-treating it under a low oxygen atmosphere.

Effect of the Invention

The composite of the thin film particles (oxidized form and reduced form carbon nanofilms) having a carbon skeleton and the macromolecule or the reactive compound, provided by the present invention, is a novel system having a structure of a relatively low periodicity. The above composite has properties such as high strength, barrierability to a small molecule, electric conductivity, an anti-electrification property, electromagnetic shieldability, light resistance and weather resistance.

EXAMPLES

The present invention will be explained more in detail with reference to Examples hereinafter, while the present invention shall not be limited to these Examples.

Thin Film Particles and Dispersion thereof (Production of Oxidized Form Thin Film Particles having a Planar-direction Size of about 20 $\mu$m)

10 g of natural graphite (supplied by SEC Corporation, SNO-25, purity 99.97 wt % or more, a refined article from which impurities, etc., were removed by heating at 2,900° C., average particle diameter 24 $\mu$m, particle diameter 4.6 $\mu$m or less 5 wt % and particle diameter 61 $\mu$m or more 5 wt %) was added to a mixed liquid containing 7.5 g of sodium nitrate (purity 99%), 621 g of sulfuric acid (purity 96%) and 45 g of potassium permanganate (purity 99%), and the mixture was allowed to stand at about 20° C. for 5 days with stirring mildly, to obtain a high viscosity liquid. The high viscosity liquid was added to 1,000 cm$^3$ of 5 wt % sulfuric acid aqueous solution (water having conductivity of less than 0.1 $\mu$S/cm was used for dilution (the same hereinafter)) over about 1 hour with stirring, and the resultant mixture was further stirred for 2 hours, to obtain a liquid. 30 g of hydrogen peroxide (30 wt % aqueous solution) was added to the above liquid and the mixture was stirred for 2 hours.

The resultant liquid was purified by centrifugation using a mixed aqueous solution of 3 wt % sulfuric acid/0.5 wt % hydrogen peroxide and centrifugation using water, to obtain an aqueous dispersion of thin film particles. From a weight change of part of the dispersion before and after drying, the concentration of the thin film particles in the dispersion was 0.45 wt %. Further, according to an elemental analysis of the thin film particles after drying at 40° C. in vacuum, the content of oxygen was about 42 wt % and the content of hydrogen was about 2 wt %. The above dispersion will be sometimes referred to as "dispersion A".

The above-obtained aqueous dispersion was laid on a glass plate. The dispersion was dried and then it was subjected to an X-ray diffraction measurement. A peak corresponding to 0.83 nm was obtained. This corresponds to a generally known interlayer distance of graphite oxide (when water is held in an interlayer).

The same aqueous dispersion was diluted with water by 100 times. Then, the diluted dispersion was laid on a glass plate and then dried. An attempt to obtain an average value of the thickness of the thin film particles was carried out. When the average thickness of a plurality of particles adhering to the glass plate from the dispersion by drying was calculated at about 12 nm (the density of the particles was assumed 2.1 g/cm$^3$), it was observed through an optical microscope (OM) that almost three sheets of the particles were stacked in all portions of the surface where the dispersion extended (although the particles were extremely thin, they could be discriminated since the reflective index thereof was higher than that of the glass). Accordingly, it was estimated that the respective thin film particles had a thickness of less than 4 nm on average. Further, it was confirmed from the above observation that the average planar direction size of the thin film particles was about 20 $\mu$m.

Further, the above dispersion was concentrated by centrifugation to obtain a dispersion having a concentration of 1.5 wt %. Furthermore, the dispersion was diluted to obtain a dispersion having a concentration of 0.5 wt %.

(Production of Oxidized Form Thin Film Particles having a Planar-direction Size of about 2 $\mu$m or Less)

Small natural graphite (supplied by SEC Corporation, SNO-2, purification product, average particle diameter 2 $\mu$m, particle diameter 5 $\mu$m or more about 5 wt %) was fractionated by sedimentation velocity differences in methanol (purity 99.8%) to obtain particles of relatively slow sedimentation (about 15 wt % based on the whole) 0.1 g of the above fractionated natural graphite was added to a mixed liquid consisting of 0.75 g of sodium nitrate, 62.1 g of sulfuric acid and 4.5 g of potassium permanganate, and the mixture was allowed to stand at about 20° C. for 5 days with stirring mildly, to obtain a high viscosity liquid. The high viscosity liquid was added to 300 cm$^3$ of 5 wt % sulfuric acid aqueous solution with stirring. The resultant mixture was further stirred for 2 hours, to obtain a liquid 3 g of hydrogen peroxide (30 wt % aqueous solution) was added to the above liquid and the mixture was stirred for 2 hours.

The resultant liquid was purified by centrifugation using a mixed aqueous solution of 3 wt % sulfuric acid/0.5 wt % hydrogen peroxide and centrifugation using water, to obtain an aqueous dispersion of thin film particles (concentration 0.85 wt %).

From an OM observation of a diluted solution, it was found that the average thickness of the thin film particles was less than 4 nm.

(Reduction by Heating and Changes of Particles)

The before-prepared aqueous dispersion of the oxidized form thin film particles having an average planar-direction size of about 20 μm and an average thickness of less than 4 nm was placed on a borosilicate glass substrate such that the dispersion spread to about 1 cm×1 cm and that the thickness after drying was about 30 μm. A dustprotector was provided and then the dispersion on the glass substrate was allowed to stand at about 20° C. at a relative humidity of about 40%, to dry it. Then, the thin film particles on the glass substrate were heated in vacuum with increasing a temperature gradually (further, concerning heating at a high temperature of 1,200° C., the thin film particles were heated in argon after peeling off from the glass plate), and interlayer distance changes were checked by an X-ray diffraction measurement (measured in the air at about 20° C.).

As the heating temperature increased, peaks which gave interlayer distances changed from the peak of graphite oxide alone (FIG. 1($a$), corresponding to a layer structure containing oxygen, interlayer distance at 20° C. 0.83 nm), through coexistence of the peak of graphite oxide and a peak toward a peak similar to that of graphite (corresponding to coexistence of a layer structure portion containing oxygen and a layer structure portion not containing oxygen very much, interlayer distances at 150° C. 0.55 nm and 0.38 nm), to the peak similar to that of graphite alone (corresponding to a layer structure containing almost no oxygen or containing no oxygen, the broadening of the peak was larger than that of graphite, interlayer distance at 300° C. 0.37 nm, interlayer distance at 1,200° C. 0.34 nm).

The color tone and electric resistance (a simplified measurement was carried out at a distance between electrodes of approximately 1 mm using a general circuit tester, the electric resistance of a lower-oriented graphite sheet having a thickness of 0.5 mm was 1.5 Ω according to the same method) were respectively dark brown and 32 MΩ or more (beyond a measurement range) at 20° C., deep dark brown and 20 MΩ at 100° C., dark silver and 10 KΩ at 150° C., silver and 300 Ω at 200° C., and bright silver and 5 Ω at 1,200° C. Further, according to a thermogravimetric analysis, weight loss at particularly about 150° C.~210° C. was remarkable.

(Exchange of Dispersion Medium)

The before-obtained aqueous solution of the oxidized form thin film particles having an average planar-direction size of about 20 μm and an average thickness of less than 4 nm was placed in a centrifugal bottle. Acetone (relative dielectric constant at 25° C. 20.7, purity 99.5%, about two times to four times the aqueous dispersion, the magnification increased as procedures advanced) was added to the above aqueous solution, and redispersing, centrifugation (7,000 rpm, 30 minutes) and removal of a supernatant liquid were repeated three times in total. An obtained precipitation had a concentration of about 1.7 wt % and it was a lump having no flowability.

Further, 2-butanone (relative dielectric constant at 20° C. 18.5, purity 99%, about four times the acetone dispersion) was added to the above lump in the centrifugal bottle, and redispersing, centrifugation (7,000 rpm, 30 minutes) and removal of a supernatant liquid were repeated three times in total. An obtained precipitation had a concentration of about 2.0 wt % and it was a lump having no flowability.

Separately, there were used two kinds of the before-obtained aqueous dispersions which respectively contained the oxidized form thin film particles having an average planar direction size of about 20 μm and an average thickness of less than 4 nm and the thin film particles having an average planar direction size of less than about 2 μm. Each of the aqueous dispersions was individually placed in a centrifugal bottle. Methanol (relative dielectric constant at 25° C. 32.7, purity 99.8%, about two times to four times each aqueous dispersion, the magnification increased as procedures advanced) was added to each aqueous solution. Then, redispersing, centrifugation (5,000 rpm, 30 minutes) and removal of a supernatant liquid were repeated two times in total. Obtained dispersions had a concentration of 0.25 wt % and a concentration of 0.20 wt %, respectively, in order. Further, when these dispersions were further concentrated, both of the dispersions lost flowability in methanol at the time when the concentration became about 1.6 wt %.

As described above, a disperse system of the oxidized form thin film particles could be prepared by using a liquid other than water. However, inter-particle repulsion decreased in accordance with a decrease in dielectric constant so that a precipitation having a higher concentration was easily produced. Further, since the thin film particles had a high anisotropy of shape, a surrounding dispersion medium was held even at a low concentration of several % so that the flowability of the dispersions was extremely decreased.

(Reduction by Light-irradiation and Change of Particles)

Two gold wiring lines were formed on a silica glass substrate at a space of 2 mm. A thin film layer formed of the thin film particles was formed such that the thin film layer straddled the two wiring lines. The film formation was carried out by dropping an aqueous dispersion (concentration 0.5% by weight) of the oxidized form thin film particles having an average planar-direction size of about 20 μm and an average thickness of less than 4 nm between the wiring lines with a pipet and drying the dispersion medium at 80° C. for 15 minutes. The thickness of the film after the drying was about 1 μm. The thus-obtained thin film layer was irradiated with light of an ultrahigh pressure mercury lamp (supplied by Ushio Inc., USH-500D, 500W) from a distance of 20 cm. After irradiation for 20 minutes, the thin film layer was measured for resistance. From the measured resistance value, the resistivity of the thin film particles was calculated and it was 900 Ω·cm. Further, the film layer was irradiated for 20 minutes and the resistivity was 50 Ω·cm.

The state of carbons was checked by XPS (X-ray photoelectron spectroscopy). Although two peaks were found at 284.5 eV (derived from C—C and C=C bonds) and 286.5 eV (derived from C—O bonds) before the light irradiation, the peak of 286.5 eV largely decreased after the light irradiation. This showed that the ratio of carbon bonded to oxygen decreased and the ratio of carbon bonded to carbon increased. In addition, it was confirmed from IR (infrared spectroscopy) analysis that hydroxyl groups were decreased by the light irradiation.

Example 1

A methanol dispersion of thin film particles and a methanol solution of poly(vinyl acetate) (PVAc) were mixed and the mixture was dried to obtain a composite.

PVAc (degree of polymerization about 1,500) was dissolved in methanol to obtain a solution. To this solution added was a methanol dispersion (concentration 0.25 wt %) of oxidized form thin film particles having an average planar-direction size of about 20 μm and an average thickness of less than 4 nm or a methanol dispersion (concentration 0.20 wt %) of oxidized form thin film particles having an average planar-direction size of less than about 2 μm and an average thickness of less than 4 nm such that the fraction of the thin film particles based on the whole after drying became 2 wt % or 4 wt %. In this manner, there were prepared respective mixed solutions each of which contained PVAc and either of the thin film particles in a total concentration of 4 wt %. Further, there was prepared a solution of PVAc alone, as a control.

Each of the mixed solutions (four kinds in total, that is, two kind of mixed solutions having a fraction, after drying, of 2 wt %, which solutions respectively contained the thin film particles having a planer-direction size of about 20 μm and the thin film particles having a planer-direction size of about 2 μm, and two kind of mixed solutions having a fraction, after drying, of 4 wt %, which solutions respectively contained the thin film particles having a planer-direction size of about 20 μm and the thin film particles having a planer-direction size of about 2 μm) was extended on a glass plate in such a liquid volume that the thickness after drying became about 30 μm, after removing dusts through a stainless steel mesh having a hole size of 80×80 um, followed by drying (temperature-increasing to 50° C. after about 25° C., drying in vacuum at 50° C., and further temperature-increasing to 100° C. (annealing at the same time)) and peeling at a room temperature, thereby obtaining four kinds of composite films. Further, the solution of PVAc alone was extended in a polystyrene container and then dried. Then, a dried film was peeled off and transferred onto a slide glass and the transferred film was dried in vacuum at 100° C. Then, it was peeled off at a room temperature to obtain a PVAc film.

The above four kinds of composite films were slightly hard and fragile when compared with the film of PVAc alone which was flexible.

Among the obtained films, two kinds of the films each of which had a fraction of 4 wt % were accurately measured for thickness. Then, each film was adhered to a mouth of a sample glass bottle containing water. The adhesion was carried out by dropping a small amount of methanol only to surroundings of each of the films. These bottles with the films were allowed to stand in a desiccator (temperature 25 to 30° C., relative humidity less than 1%) containing a silica gel, and each film was analyzed for a permeability coefficient of water from a weight change of water before and after the standing. The permeability coefficient was calculated from wvx/{Atp(1-H/100)}, in which w is a weight change, v is a gaseous volume per 1 g of water (1,360 cm$^3$ at 25° C. under 1 atmospheric pressure), x is a thickness, A is a permeating area, t is a standing time, p is a vapor pressure of water (corresponding to a relative humidity of 100%, 3,140 Pa at 25° C.), and H is a relative humidity (the unit is %, it is assumed 0% here).

The permeability coefficient of water was $2.4 \times 10^{-10}$ cm$^3$cm/cm$^2$/s/Pa in the case of the composite containing 4 wt % of the thin film particles having a planar-direction size of about 2 μm or less. It was $3.6 \times 10^{-10}$ cm$^3$cm/cm$^2$/s/Pa in the case of the composite containing 4 wt % of the thin film particles having a planar-direction size of about 20 μm. Both the above permeability coefficients were lower than $4.7 \times 10^{-10}$ cm$^3$cm/cm$^2$/s/Pa which was the permeability coefficient of the film of PVAc alone containing no thin film particles. Therefore, increases in barrierability owing to the thin film particles were confirmed. In particular, in the case of using the thin film particles having a planar-direction size of about 2 μm or less, the size of each particle was remarkably smaller than the thickness of the film so that the film was an almost homogeneous film. It is estimated that the effect of increasing the barrierability was therefore large.

The obtained composite film was measured by an X-ray diffraction method. A peak corresponding to an interlayer distance of 1.65 nm was obtained (FIG. 1(c)). This differed from a value of 0.83 nm which was obtained in the case of the thin film particles alone. Further, the film of PVAc alone did not give the above peak (FIG. 1(b)). In the case of the composite having a thin film particles fraction of 4 wt %, the volume fraction of PVAc was about 50 times the volume fraction of the thin film particles. Accordingly, on the assumption that the film as a whole is an intercalation compound, the interlayer distance of the intercalation compound is about 50 times the interlayer distance of the thin film particles alone and it is 30 nm or more. The above distance is beyond a measurement range of a general X-ray diffraction measurement so that a possibility that a structure near the above value partially existed can not be denied. However, the obtained value 1.65 nm does not agree with the above calculated value and it is difficult to form such a long periodic structure by simple mixing and standing for a relatively short period of time. From these points, it is obvious that the interlayer distance of 1.65 nm, obtained from the composite, was not the periodic structure of the composite as a whole. Therefore, it was estimated that the composite had a structure in which part of PVAc penetrated the insides of lots of the thin film particles and formed an intercalation compound of a short period (1.65 nm) and lots of particles of the intercalation compound randomly existed in the rest of the PVAc matrix (however, the particles had an orientation tendency since the particles had an anisotropic shape, the inter-particle average distance was several tens nm).

The obtained composite films were cut in the thickness direction to prepare ultrathin sections. These ultrathin sections were observed through a transmission electron microscope (TEM) (FIGS. 2 to 6). It was confirmed that the thin film particles, which were locally bent and transformed but relatively finely spread on the whole, existed in the PVAc matrix randomly (however, when the mixed solutions were dried, the dimensions were decreased mainly in the depth direction of the solutions so that the thin film particles had an orientation tendency in the planar direction of the composite films).

Example 2

A linear low density polyethylene (supplied by Japan Polychem Corporation, NOVATEC LL UF421) (LLDPE) was molten and stirred at 240° C. An aqueous dispersion (concentration 1.5 wt %) of oxidized form thin film particles having a planar-direction size of about 20 μm and an average thickness of less than 4 nm were gradually pressure-injected thereto and at the same time a different degassing portion was pressure-reduced to carry out removal of water and heating-reduction of the thin film particles, whereby a composite of LLDPE containing about 1 wt % of reduced form thin film particles was prepared. The composite was homogeneous and had a black color. The composite could be drawn by heating at 110° C.

Example 3

A lump composite of PC containing about 0.2 wt % of reduced form thin film particles was prepared in the same manner as in Example 2 except that a polycarbonate of 2,2-bis(4-hydroxyphenyl)propane (supplied by Mitsubishi Engineering-Plastics Corporation, Iupilon H4000) (PC) was molten at 260° C. The composite was homogeneous and had a black color.

Figure 7:
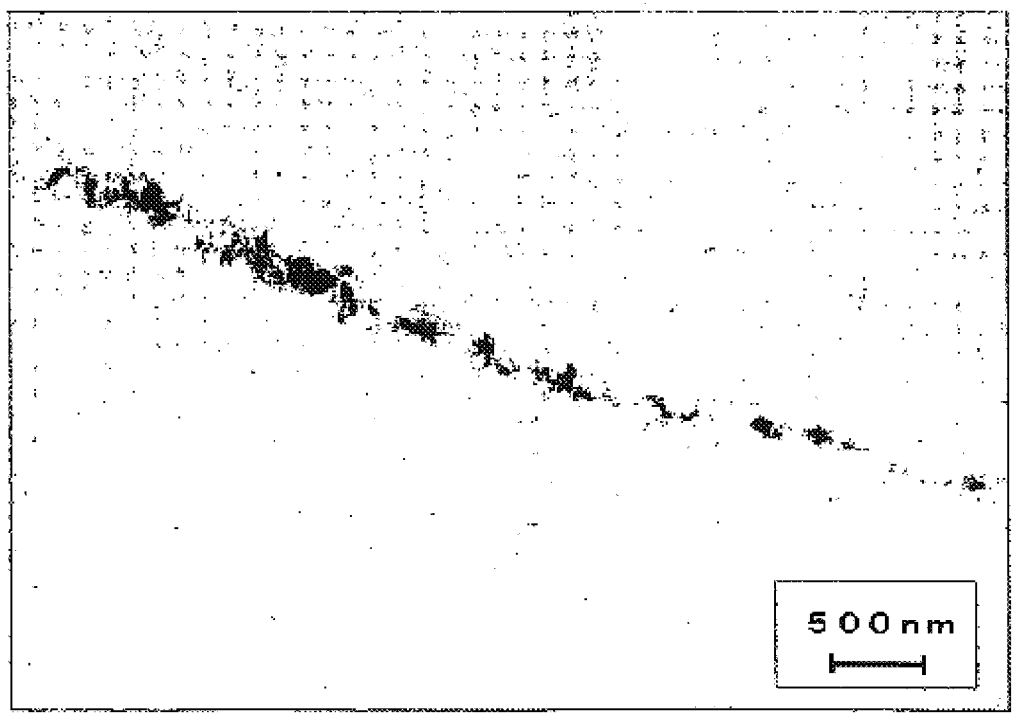
FIG. 7 shows a TEM image (a cross section of an elongated portion of a composite formed of 0.2 wt % of reduced form thin film particles having a planar-direction size of about 20 μm and polycarbonate, since the thin film particles are positioned obliquely to the cross section, the width seems to be wider as compared with, for example, FIG. 5.).
Figure 8:
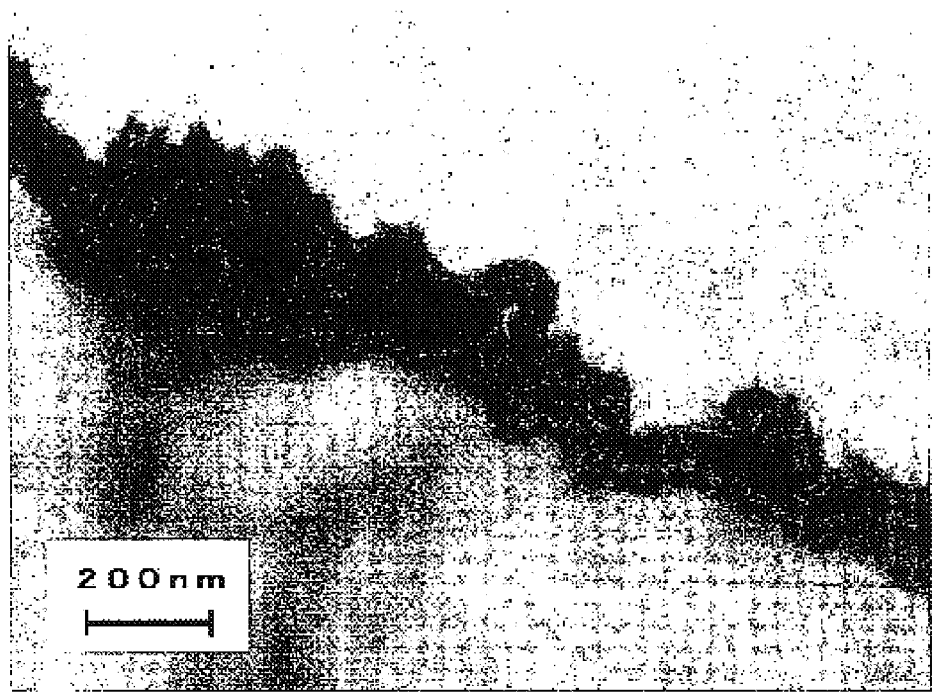
FIG. 8 shows a TEM image (the same composite as that in FIG. 7, detail).

Ultrathin sections were prepared from a main body portion of the obtained lump composite and a portion of the composite which portion was drawn until being hardened by cooling. These ultrathin sections were observed through TEM (FIGS. 7 and 8). In each portion, it was confirmed that the thin film particles, which were locally largely bent and transformed but were relatively well-spread on the whole (further well-spread in the drawn portion), existed in the PC matrix randomly.

Example 4

A composite of PA6 containing about 0.2 wt % of reduced form thin film particles was prepared in the same manner as in Example 2 except that a polyamide of caprolactam (supplied by Mitsubishi Engineering-Plastics Corporation, NOVAMID 1020J) (PA6) was molten at 230° C. The composite was homogeneous and had a black color.

Ultrathin sections were prepared from the obtained lump composite in the same manner as in Example 3 and these sections were observed through a TEM. It was confirmed that the thin film particles had a morphology similar to that of Example 3.

Example 5

A composite of PAMXD6 containing about 0.2 wt % of reduced form thin film particles was prepared in the same manner as in Example 2 except that a polyamide of m-xylylenediamine and adipic acid (supplied by Mitsubishi Engineering-Plastics Corporation, Reny 6001) (PAMXD6) was molten at 260° C. The composite was homogeneous and had a black color.

Example 6

A composite of EVOH containing about 0.2 wt % of reduced form thin film particles was prepared in the same manner as in Example 2 except that an ethylene-vinylalcohol copolymer (supplied by Kuraray Co.,Ltd., EVAL G156A, molar fraction of ethylene 0.47) (EVOH) was molten at 200° C. The composite was homogeneous and had a black color.

Example 7

A composite of POM containing about 0.2 wt % of reduced form thin film particles was prepared in the same manner as in Example 2 except that poly(methylene oxide) (supplied by Mitsubishi Engineering-Plastics Corporation, Iupital F40-10) (POM) was molten at 210° C. The composite was homogeneous and had a black color.

Example 8

2-butanone was added to a 2-butanone dispersion (concentration 2.0 wt %) of oxidized form thin film particles having an average planar-direction size of about 20 $\mu$m and an average thickness of less than 4 nm, and the mixture was stirred to obtain a 2-butanone dispersion having a concentration of 0.5 wt %. This dispersion was mixed with an epoxy resin (cresol-novolac-epoxy type (a molecule had a plural of epoxy groups), imidazoles as a hardening agent, 60 wt % 2-butanone solution). The mixture was placed in a container made of polytetrafluoroethylene and the mixture was heated up to 60° C. and pressure-reduced with stirring, to remove 2-butanone. Then, the resultant mixture was hardened by heating at 160° C. for 2 hours, to obtain a composite of an cured epoxy resin containing about 1.5 wt % of thin film particles.

It is estimated that, in the above composite, epoxy groups of the epoxy resin were ring-opened and joined to hydroxyl groups of the thin film particles, which generated a lot of covalent bonds between the thin film particles and the epoxy resin as a matrix similarly to the inside of the matrix.

Example 9

A composite of thin film particles and a silica glass was prepared by a sol-gel method in which a pore size distribution was adjusted by changing a pH in three stages.

30 cm$^3$ of 0.01 N ammonia aqueous solution was added to a mixed solution containing 60 cm$^3$ of tetramethoxysilane and 30 cm$^3$ of methanol, and the mixture was stirred at 0° C. for 1 hour, to obtain a sol. The hydrolysis rate (according to gas chromatograph) of tetramethoxysilane in the above sol of the first stage was 37%. Further, 24 cm$^3$ of 0.05 N hydrochloric acid aqueous solution was added to the above sol and the resultant mixture was stirred at 0° C. for 1 hour, to terminate hydrolysis and obtain a sol of the second stage. To 20 g of the above sol was added 10 g of an aqueous dispersion (concentration 0.5 wt %, pH about 1.5) of oxidized form thin film particles having an average planar-direction size of about 20 $\mu$m and an average thickness of less than 4 nm, and the mixture was stirred. Then, 0.1 N ammonia aqueous solution was further added to the mixture to adjust the pH to about 4.5 and to obtain a sol of the third stage.

This sol was poured to a plurality of small containers made of polystyrene such that the depth in each container became about 3 mm. The sol in each container was allowed to undergo gelation. The resultant gel was immersed in a large amount of water to remove ammonium chloride, then the gel was placed in a container covered with a lid having an opening ratio of 3%, and the gel was dried in a thermo-hygrostat (shifted from conditions of 40° C. and a relative humidity of 80% to conditions of 40° C. and a relative humidity of 20% over 15 days) to obtain a porous silica glass composite containing oxidized form thin film particles and having a dark brown color. Further, the porous composite was heated up to 400° C. in air and then it was heated up to 1,000° C. in argon and burnt to obtain a nonporous composite. The content of reduced form thin film particles in the composite was calculated about 0.7 wt %.

Further, it is estimated that, particularly in the composite before the heating, hydroxyl groups of silicic acid generated by hydrolysis of the tetramethoxysilane were bonded to hydroxyl groups of the oxidized form thin film particles by dehydration linkage, which generated a lot of covalent bonds between the thin film particles and the silica as a matrix similarly to the inside of the matrix.

Example 10

8 g of a dispersion (concentration 0.5% by weight) of oxidized form thin film particles having an average planar-direction size of about 20 $\mu$m and an average thickness of less than 4 nm was added to 392 g of water (relative dielectric constant 70 to 80), and the resultant dispersion was placed in an autoclave. The pressure in the autoclave was increased to 2.5 MPa by introducing air, and the dispersion was heated up to 200° C. over 1 hour while rotating stirring propellers at 500 rpm. Then, the dispersion was held at 200° C. for 3 hours.

The dispersion was cooled to room temperature and the dispersion after the treatment was taken out from the autoclave. It was found that the color of the dispersion was changed to black and the high dispersed state of the thin film particles was maintained.

The state of carbon was checked by XPS (X-ray photoelectron spectroscopy). Although two peaks were found at 284.5 eV (derived from C—C and C=C bonds) and 286.5 eV(derived from C—O bonds) before the heat-treatment, the peak of 286.5 eV largely decreased after the heat-treatment. This showed that the ratio of carbon bonded to oxygen decreased and the ratio of carbon bonded to carbon increased. In addition, it was confirmed from IR (infrared spectroscopy) analysis that hydroxyl groups were decreased by the heat-treatment.

Then, the resistivity of the thin film particles after the heat-treatment was calculated from a resistance value measurement. The calculation was carried out by the following method. That is, two gold wiring lines were formed on a silica glass substrate at a space of 2 mm. A thin film layer formed of the thin film particles after the heat-treatment was formed such that the thin film layer straddled the two wiring lines. The film formation was carried out by dropping the oxidized form thin film particles after the heat-treatment between the wiring lines with a pipet and drying a dispersion medium at 80° C. for 15 minutes. The thickness of the film after the drying was about 1 μm. The thus-obtained thin film layer was measured for a resistance. From its cross section and a length between the wiring lines, the resistivity was calculated and it was 100 Ω·cm.

Example 11

0.5 g of a dispersion A was added to 24.5 of dimethyl sulfoxide (relative dielectric constant 48.9) to obtain a dispersion of thin film particles, and the obtained dispersion was heated at 160° C. for 10 hours. As a result of the heating, the color of the dispersion was changed to from brown to black. The high dispersed state of the thin film particles was maintained. As a result of a measurement similar to the measurement in Example 10, the resistivity was 1,000 Ω·cm.

Example 12

1 g of a dispersion A was added to 24.5 of dimethyl sulfoxide, and 24.5 of 1-hexanol (relative dielectric constant 13.3) was further added to the resultant mixture, to obtain a dispersion of thin film particles. The obtained dispersion was heated at 160° C. for 10 hours. As a result of the heating, the color of the dispersion was changed to from brown to black. The high dispersed state of the thin film particles was maintained. As a result of a measurement similar to the measurement in Example 10, the resistivity was 12,000 Ω·cm.

Example 13

To 100 ml of the same dispersion as the heat-treated dispersion obtained in Example 10 was added methanol in an amount about three times the amount of the dispersion. The mixture was subjected to centrifugation (5,000 rpm, 30 minutes) and then a supernatant liquid was removed. Then, addition of methanol and centrifugation were repeated two times, to obtain a dispersion of thin film particles using methanol as a dispersion medium. The concentration of the thin film particles was 0.2 wt %.

Then, poly(vinyl acetate) (PVAc, degree of polymerization about 1,500) was dissolved in methanol. Then, the above-obtained methanol dispersion and the PVAc methanol solution were mixed such that the amount of the thin film particles was 2 wt % based on the total amount of the PVAc and the thin film particles. The resultant mixed solution was extended on a glass plate and it was gradually heated and dried. Then, a 30 μm-thick PVAc film containing 2 wt % of the thin film particles was obtained by peeling at room temperature. The obtained film had a black color and the dispersed state of the thin film particles in the PVAc was good.

What is claimed is:

1. A composite formed of a component (a) or a component (b) and a component (c), or the component (a) or the component (b) and a component (d),
   (a) oxidized form thin film particles which are obtained by oxidizing graphite, have a carbon skeleton, have a thickness of 0.4 nm to 10 nm and a planar-direction size of at least 20 nm, and are dispersible in a liquid having a relative dielectric constant of at least 15,
   (b) reduced form thin film particles obtained by partially or completely reducing the above thin film particles so as to have an oxygen content of 0 to 35 wt %,
   (c) a macromolecule as a matrix component, and
   (d) low molecular-weight parts which bond a plurality of the thin film particles by a covalent bond.

2. A composite according to claim 1,
   wherein the composite has an internal structure having a low periodicity.

3. A composite according to claim 1,
   wherein the reduced form thin film particles are obtained by heating a dispersion in a liquid of thin film particles which have a thickness of 0.4 nm to 100 nm and a planar-direction size of at least 20 nm, have a carbon skeleton, are obtained by oxidizing graphite and are dispersible in a liquid having a relative dielectric constant of at least 15, at 130° C. or higher, to reduce the thin film particles while holding the dispersed state of the thin film particles.

4. A composite according to claim 3,
   wherein the reduced form thin film particles have a resistivity, after the heating, of 10,000 Ω·cm or less.

5. A composite according to claim 1,
   wherein the reduced form thin film particles are obtained by irradiating thin film particles which have a thickness of 0.4 nm to 100 nm and a planar-direction size of at least 20 nm, have a carbon skeleton, are obtained by oxidizing graphite and are dispersible in a liquid having a relative dielectric constant of at least 15, with light.

6. A composite according to claim 5,
   wherein the irradiation light has a wavelength in the range of from 100 nm to 1,100 nm.

7. A composite according to claim 5,
   wherein the reduced form thin film particles have a resistivity, after the light irradiation, of 10,000 Ω·cm or less.

8. A composite according to claim 5,
   wherein the light irradiation is carried out by irradiating a dispersion liquid of the thin film particles with light.

9. A process for the production of a composite formed of thin film particles and a macromolecule as recited in claim 1, which process comprises mixing a dispersion of oxidized form thin film particles with a macromolecule which is in a molten state together with removing a dispersion medium of the dispersion.

10. A process for the production of a composite formed of thin film particles and a macromolecule as recited in claim 1, which process comprises mixing a dispersion of oxidized form thin film particles with a macroinolecule which is in the form of a solution and then removing a dispersion medium of the dispersion and a solvent of the macromolecule solution.

11. A process according to claim 10,
wherein the dispersion medium of the oxidized form thin film particles and the solvent of the macromolecule are the same liquid or liquids which have miscibility to each other.

12. A process for the production of a composite formed of thin film particles and a macromolecule as recited in claim 1, which process comprises mixing a dispersion of oxidized form thin film particles with a polymerizable compound or a solution of the polymerizable compound, polymerizing the polymenzable compound to convert it into a macromolecule and removing a dispersion medium of the dispersion or the dispersion medium and a solvent of the solution.

13. A process according to claim 12,
wherein the dispersion medium of the oxidized form thin film particles and the solvent of the polymerizable compound are the same liquid or liquids which have miscibility to each other.

14. A process for the production of a composite formed of thin film particles and low molecular-weight parts which bond the thin film particles to each other, as recited in claim 1, which process comprises mixing a dispersion of oxidized form thin film particles with a reactive compound having at least one functional group which can form a covalent bond with the thin film particles or a solution of the above reactive compound to bond a plurality of the thin film particles to each other by covalent bonds and removing a dispersion medium of the dispersion or the dispersion medium and a solvent of the solution.

15. A process according to claim 14,
wherein the dispersion medium of the oxidized form thin film particles and the solvent of the reactive compound are the same liquid or liquids which have miscibility to each other.

16. A material having a gas barrier ability, using a composite as recited in claim 1.

17. A material having a thermal conductivity, using a composite as recited in claim 1.

18. An electrically-conductive material using a composite as recited in claim 1.

19. A material having an anti-electrification property, using a composite as recited in claim 1.

20. A material having an electromagnetic shieldability, using a composite as recited in claim 1.

21. A material for heat generation, using a composite as recited in claim 1.

22. A light resistant and weather resistant material using a composite as recited in claim 1.

23. An incineratable material using a composite as recited in claim 1.

24. A material reusable by melting, which material uses a composite as recited in claim 1.

25. A flame retardant material using a composite as recited in claim 1.

26. A material having heat resistance under a nonoxidative atmosphere, which material uses a composite as recited in claim 1.

27. A protection material such as a paint, a sealant and a resist, which material uses a composite as recited in claim 1.

28. A material utilizing the electronic nature or optical property of each thin film particle, which material uses a composite as recited in claim 1.

29. A material for a catalyst or for adsorption, using a composite as recited in claim 1.

30. A material which is obtained by heat-treating a composite as recited in claim 1 in a low oxygen atmosphere to advance carbonization.

31. A method for reducing thin film particles which are obtained by oxidizing graphite, have a carbon skeleton and are dispersible in a liquid having a relative dielectric constant of at least 15, which method comprises heating a dispersion of the thin film particles in a liquid at 130° C. or higher, to reduce the thin film particles while holding the dispersed state of the thin film particles.

32. A method according to claim 31,
wherein the thin film particles have a thickness of 0.4 nm to 100 nm and a planar-direction size of at least 20 $\mu$m.

33. A method according to claim 31,
wherein the thin film particles have a resistivity, after the heating, of 10,000 $\Omega$·cm or less.

* * * * *